United States Patent
Romer et al.

(10) Patent No.: US 7,304,574 B2
(45) Date of Patent: Dec. 4, 2007

(54) ALARM INVESTIGATION USING RFID

(75) Inventors: Kevin Romer, Boca Raton, FL (US); Harry Watkins, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 211 days.

(21) Appl. No.: 11/055,215

(22) Filed: Feb. 10, 2005

(65) Prior Publication Data

US 2006/0187042 A1 Aug. 24, 2006

(51) Int. Cl.
*G08B 13/14* (2006.01)

(52) U.S. Cl. ............... 340/572.1; 340/572.6; 340/539.1; 340/572.4

(58) Field of Classification Search ............ None
See application file for complete search history.

(56) References Cited

U.S. PATENT DOCUMENTS

| | | | | |
|---|---|---|---|---|
| 5,939,984 A * | 8/1999 | Brady et al. | ............. | 340/572.1 |
| 5,955,951 A * | 9/1999 | Wischerop et al. | ...... | 340/572.8 |
| 5,990,794 A * | 11/1999 | Alicot et al. | ............ | 340/573.1 |
| 6,025,780 A * | 2/2000 | Bowers et al. | ........... | 340/572.3 |
| 6,121,878 A * | 9/2000 | Brady et al. | ............. | 340/572.1 |
| 6,169,483 B1 * | 1/2001 | Ghaffari et al. | ......... | 340/572.3 |
| 6,232,870 B1 * | 5/2001 | Garber et al. | ............. | 340/10.1 |
| 6,265,977 B1 * | 7/2001 | Vega et al. | ............. | 340/572.7 |
| 6,362,738 B1 * | 3/2002 | Vega | ........................ | 340/572.1 |
| 6,497,361 B1 * | 12/2002 | Mason | ....................... | 235/383 |
| 7,042,359 B2 * | 5/2006 | Clucas | ................... | 340/572.1 |
| 7,109,867 B2 * | 9/2006 | Forster | ................... | 340/572.3 |
| 7,170,414 B2 * | 1/2007 | Clifford et al. | .......... | 340/572.3 |
| 2003/0234288 A1 * | 12/2003 | Canipe et al. | ............. | 235/383 |
| 2004/0233042 A1 * | 11/2004 | Piccoli et al. | .............. | 340/10.1 |

* cited by examiner

*Primary Examiner*—Benjamin C. Lee
*Assistant Examiner*—Son Tang
(74) *Attorney, Agent, or Firm*—Alan M. Weisberg; Christopher & Weisberg, P.A.

(57) ABSTRACT

A method according to one embodiment may include detecting an activated electronic article surveillance (EAS) tag in an interrogation zone, and reading at least one radio frequency identification (RFID) tag in response to the detecting of the activated EAS tag in the interrogation zone to investigate a cause of the EAS tag in said interrogation zone. A method according to another embodiment may include detecting a condition representative of an activated RFID tag in a controlled area, and taking corrective action to prevent removal of the activated RFID tag from the controlled area.

18 Claims, 7 Drawing Sheets

ALARM INVESTIGATION USING RFID

FIELD

This disclosure relates radio frequency identification (RFID) and electronic article surveillance (EAS) systems and, more particularly to alarm investigation using RFID.

BACKGROUND

A variety of EAS systems are well-known. In a typical EAS system, EAS tags designed to interact with an electromagnetic field or "interrogation zone" located at the exits of a controlled area are attached to articles to be protected. When an article is properly purchased or otherwise authorized for removal from the protected area, the EAS tag is either removed or deactivated depending on the type of EAS tag. If the EAS tag is not removed or deactivated and moved into the interrogation zone, the electromagnetic field causes a response from the EAS tag that is detected by the EAS system. Upon detection of an activated EAS tag, the EAS system may generate an alarm. However, an EAS tag on an item either properly purchased or otherwise authorized for removal may inadvertently not be deactivated or removed, setting off a "non-theft" alarm at the store exit.

EAS alarms should therefore be investigated to determine if the alarm was a non-theft alarm or an attempted unauthorized removal of a protected article. EAS alarm events should also be recorded and tracked to enable analysis and reporting of such events. Historically, and also currently in many retail establishments, investigation and recording of EAS alarms is performed manually by retail personnel. For instance, in investigating an EAS alarm retail personnel may physically examine any sales receipt and compare the sales receipt to those items being removed. To record EAS alarm events, retail personnel may then manually enter data regarding the alarm into a handwritten log. Such a manual process of investigation and recording is time consuming for retail personnel, delays analysis and reporting of the alarm events, and is prone to errors, e.g., mistaken reconciliation of items on the receipt with items being removed, data entry errors in the handwritten log, the lack of recording of some EAS alarm events, etc.

In part to improve such manual investigation and reporting, an alarm management unit electronic device and its accompanying system may be utilized. The alarm management unit may provide a user interface, e.g., a keypad, to enable a user such as retail personnel to enter pertinent data regarding each EAS alarm event without the use of handwritten logs. The alarm management unit may then communicate such data over a communication network to local and/or regional offices of the retail store to provide authorized personnel with the ability to efficiently collect, report, and analyze such data.

Although the alarm management unit and system improves the manual EAS alarm data collection and logging process, retail personnel have still been required to investigate the EAS alarm. For instance, a barcode scanner may be coupled to the alarm management unit to assist with the alarm investigation process. However, even with the barcode scanner, retail personnel time and resources are still required to scan the receipt to gather information about the point-of-sale (POS) transaction and/or to identify each item being removed and scan the barcode label affixed to each item. Then, the retail personnel may manually reconcile the items being removed with those identified on the sale receipt. This manual alarm investigation process is time consuming and can frustrate a customer with additional delays. This manual process may also be susceptible to errors by the retail personnel. Furthermore, the last impression a customer may have of the retail establishment is being searched and delayed due to a non-theft alarm. Rather than investigate each EAS alarm, it is also possible that retail personnel may wrongfully assume an EAS alarm is a non-theft alarm and fail to investigate thus enabling unauthorized removal of articles.

Accordingly, there is a need for an efficient and reliable system for EAS alarm investigation.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

The present disclosure will be described herein in connection with various embodiments. Those skilled in the art will recognize that the features and advantages of the present disclosure may be implemented in a variety of configurations. It is to be understood, therefore, that the embodiments described herein are presented by way of illustration, not of limitation. Also, the present disclosure references activated and deactivated EAS and RFID tags. As used, herein, an "active" or "activated" EAS or RFID tag refers to a passive or battery powered tag configured to generate an alarm or transmit data. As used herein, an "inactive" or "deactivated" EAS or RFID tag refers to a passive or battery powered tag that does not generate an alarm or transmit data.

Figure 1:
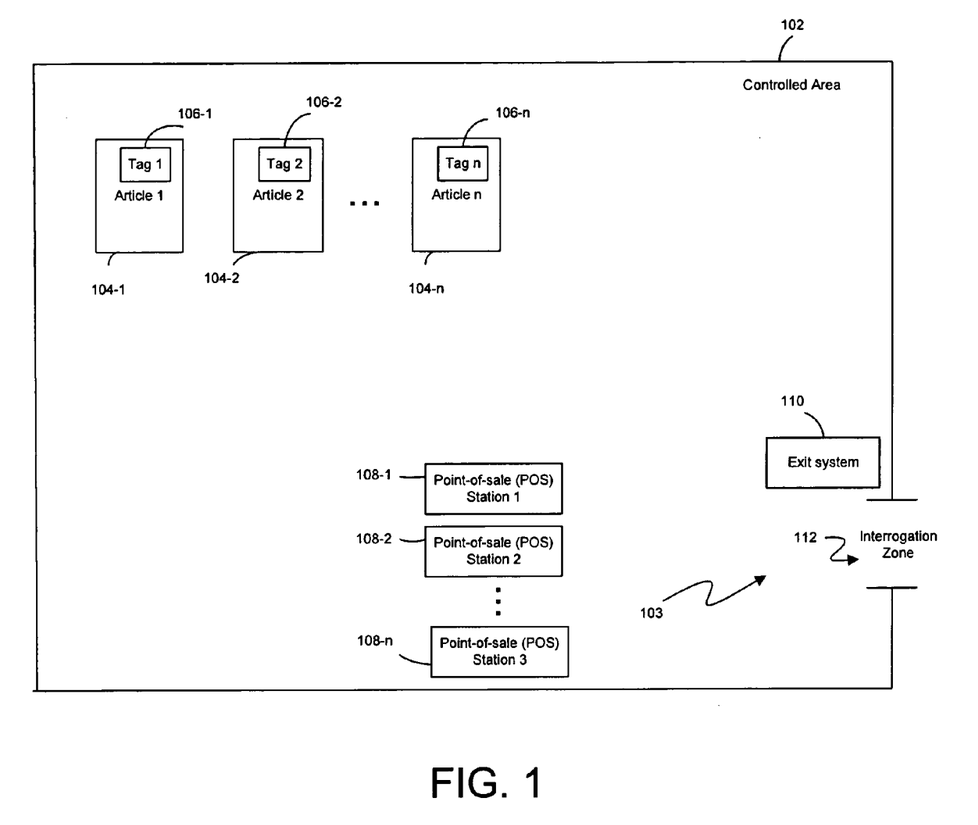
FIG. 1 is block diagram of a controlled area including a point-of-sale station and an exit system consistent with an embodiment.

FIG. 1 is a block diagram of a controlled area 102, e.g., a retail establishment, having an exit area 103. A plurality of articles 104-1, 104-2 . . . 104-n may be located in the controlled area 102, and each article 104-1, 104-2 . . . 104-n may have an associated tag 106-1, 106-2 . . . 106-n. The controlled area may also include a plurality of point-of-sale (POS) stations 108-1, 108-2 . . . 108-n where customers may properly purchase articles 104-1, 104-2 . . . 104-n. The POS stations may also be equipped to modify the state of the tags, e.g., for purchased articles. An exit system 110 may be provided near the exit area, and/or at any other location in the controlled area, to perform a variety of functions including deterrence of unauthorized removal of articles 104-1, 104-2 . . . 104-n from the controlled area 102 depending on the presence and state of tags 106-1, 106-2 . . . 106-n on such articles. The exit system 110 may include an EAS system that provides an electromagnetic field or interrogation zone 112 sufficient to detect activated tags and generate an associated alarm.

Figure 2:
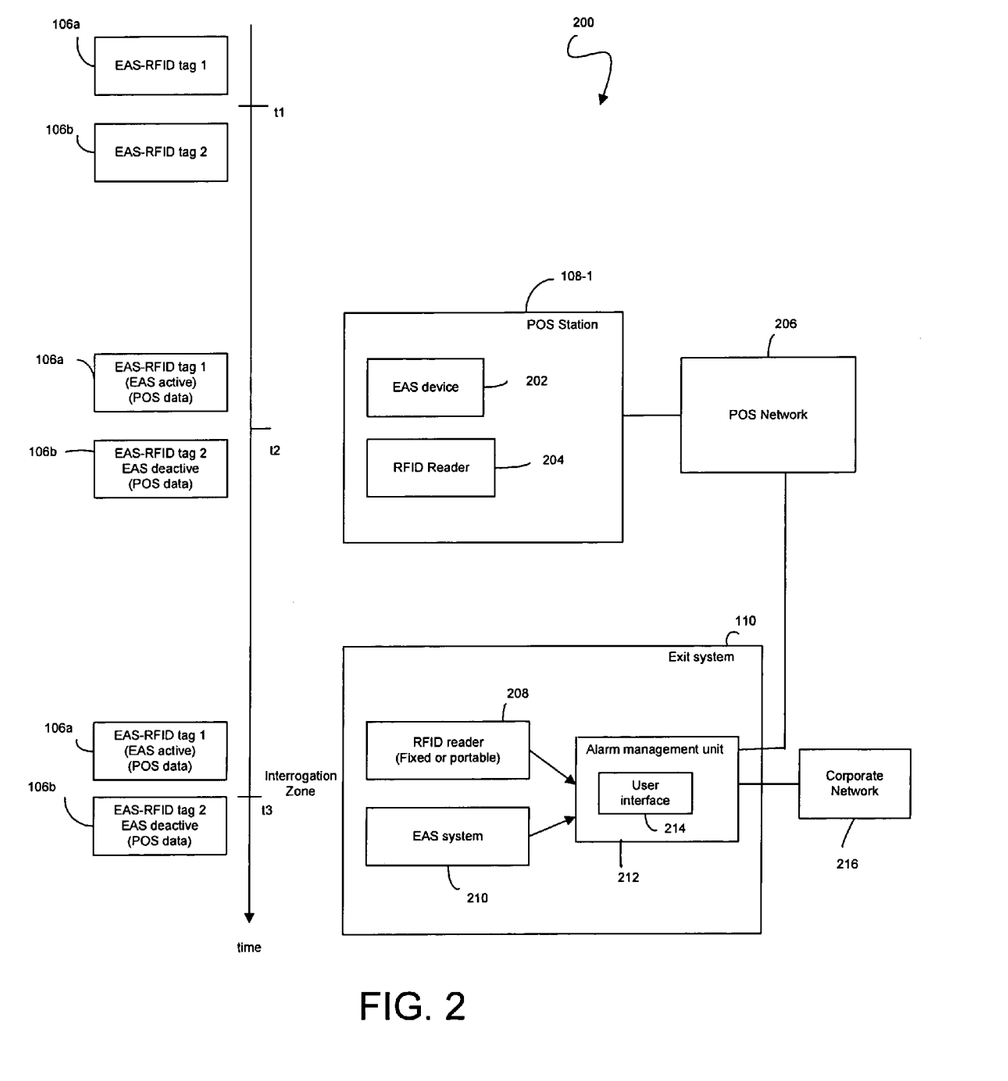
FIG. 2 is a more detailed block diagram of a point-of-sale station and exit system that may be utilized in the controlled area of FIG. 1 with an RFID tag affixed to an article.

FIG. 2 is a block diagram illustrating an embodiment 200 of a system consistent with the system of FIG. 1 capable of investigation of an EAS alarm to determine a cause of the alarm. The system 200 may utilize a combination of RFID and EAS systems. The EAS and RFID tags may be separate tags that are separately affixed to articles, or they may be integrated into a combined EAS-RFID tag, such as tags 106a and 106b.

At the POS station 108-1, an EAS device 202 may be utilized to detect and modify the activation state of the EAS portion of the tags 106a, 106b associated with articles. The EAS device 202 may deactivate the EAS portion of tags associated with articles that are properly purchased or otherwise authorized for removal. Those skilled in the art will recognize that the EAS portion of the tags 106a, 106b may take a variety of configurations. Three common EAS tags configurations are EM (electromagnetic), RF (Radio-Frequency), and AM (Acousto-Magnetic) tags. These three different types only operate within their respective detection, activation, and deactivation systems. A variety of transmitter and receiver systems for detecting the presence of such EAS tags and modifying the activation state of such tags are well-known and are commercially available. Accordingly, the basic methods of exciting and detecting such tags will not be repeated here.

An RFID reader 204 may also be located at the POS station 108-1. The RFID reader may be separate from the EAS device, or may be combined with the EAS system into an integrated EAS/RFID system. The RFID reader 204 may scan for the RFID portion of the tags 106a, 106b by transmitting an interrogation signal at a known frequency. The RFID portion of the tags 106a, 106b may respond to the interrogation signal with a response signal containing, for example, data associated with the article or an RFID tag ID. The RFID reader 204 may detect the response signal and decode the data or the RFID tag ID. The RFID reader 204 may also be configured to transmit a signal to the RFID portion of the tag representative of POS transaction information so that, in response, the RFID portion of the tag 106a or 106b may store information related to the POS transaction. This POS transaction information may include, but not be limited to, the particular POS station, the time and date of purchase, the price including any discounts, information detailing if the EAS portion of the EAS-RFID tag was deactivated, etc. A variety of transmitter and receiver system configurations for the RFID reader 204 for detecting the presence of RFID tags and modifying the state of such RFID tags are well-known and are commercially available.

The POS station 108-1 may be capable of bidirectional communication with a POS network 206 to exchange various data and/or commands between network nodes, e.g. other POS stations, the exit system 110, etc. Data exchanged via the network may include, for example, data related to POS transactions, updates of inventory information, price information, etc. Bidirectional communication may be established using any known communication protocol.

The exit system 110 may include a RFID reader 208 and an EAS system 210. The RFID reader 208 and the EAS system 210 may be separate systems, or may be combined into an integrated RFID/EAS system. The RFID reader 208 may be a fixed RFID reader this is fixed at a physical location. In one instance, the physical location may be proximate the interrogation zone. Alternatively, the RFID reader may be a portable RFID reader, e.g., a handheld RFID reader, which may be transported to a desired location. The RFID reader 208 may scan for the RFID portions of tags 106a, 106b and read information stored therein, as detailed earlier.

The EAS system 210 may establish an electromagnetic field or interrogation zone 112 located at the exit of the controlled area 102. The EAS system 210 may detect the presence of an activated EAS tag within the interrogation zone. If an EAS tag is not removed or deactivated and moved into the interrogation zone, the electromagnetic field established by the EAS system 210 causes a response from the EAS tag. An antenna of the EAS system 210 acting as a receiver may detect the EAS tag's response, indicating that an activated marker is in the interrogation zone 112. An associated controller of the EAS system 210 may provide an indication of this condition, e.g., an audio alarm, such that appropriate action can be taken to investigate the alarm.

The RFID reader 208 and EAS system 210 may be configured for bidirectional communication with an alarm management unit 212. The alarm management unit 212 may include a user interface 214 to enable a user to enter data to the unit 212. In one exemplary embodiment, the alarm management unit 212 may be an Ultralink CBC-4020 alarm management unit commercially available from the Assignee of the subject application. The alarm management unit 212 may be configured for bidirectional communication with the POS network 206 and/or a corporate network 216.

In operation, at time t1 combined EAS-RFID tags 106a, 106b may be affixed to associated articles and located in the controlled area 102. The EAS portion of the tags 106a and 106b may be in an activated state at this time and the RFID portion of the tags may store pertinent data regarding the associated articles. A customer may wish to purchase the articles associated with such tags 106a, 106b and transport such items to the POS station 108-1.

During the POS transaction at time t2, the EAS portions of both tags 106a and 106b should be deactivated by the EAS device 202. However, for various reasons, the EAS portion of tag 106a may inadvertently not be deactivated. Also during the POS transaction, RFID reader 204 may communicate POS transaction data to the RFID portion of the tags 106a and 106b which may be stored by the RFID portion of the tag. This POS transaction data may include, but not be limited to, the particular POS station, the time and date of purchase, purchase price, any discounts, etc.

At time t3, the customer may approach the interrogation zone 112 at the exit of the controlled area 102. At this time, the EAS system 210 of the exit system would detect the presence of any activated EAS portion of the tag 106a in the interrogation zone 112. An investigation should then be undertaken to determine whether the EAS alarm event is due to attempted theft or a non-theft alarm as in the current example where the EAS portion of the tag 106a was inadvertently not deactivated at the POS station 108-1 for a properly purchased article.

Advantageously, investigation of the EAS alarm event may be conducted automatically without any personnel intervention in one instance using the RFID reader 208 which may be fixed to a location proximate the interrogation zone. In this instance, after the EAS system 210 detects the presence of the activated EAS portion of the tag 106a in the interrogation zone 112, the RFID reader 208 may scan the articles being removed and read the RFID portion of a combined EAS-RFID tag in the interrogation zone. The RFID reader 208 may perform such scanning without requiring personnel to handle each article separately.

The RFID system 210 may then ascertain the identity of the articles being removed and also the POS transaction data that may be stored in one or more of the tags. This data may then be efficiently reconciled to determine which articles are the subject of an attempted theft and which articles may not have been properly processed at the POS station. As such, personnel are not required to perform a manual comparison between a customer receipt and articles being removed. The RFID reader may be equipped with an EAS device to deactivate an EAS tag that was inadvertently not deactivated at the POS station. Customer delay may therefore be minimized. Furthermore, data relating to each EAS alarm event may be recorded and stored in the alarm management unit 214. The data may be communicated to the POS network 206 and/or the corporate network 216 for further storage, analysis, and/or reporting to assist in identifying the source of any non-theft alarms and to allow for correction.

To permit personnel to investigate an EAS alarm event, the RFID reader 208 may be a portable reader, e.g., a handheld reader. Personnel may respond to an EAS alarm and utilize the portable RFID reader to efficiently scan the RFID tags of all the articles being removed by a customer without having to handle each item separately. The portable RFID reader may thus efficiently obtain the POS transaction data and communicate the data, e.g. via wireless connection, to the alarm management unit 212. The alarm management unit 212 may quickly reconcile information detailing articles being removed compared to articles properly purchased to determine the cause of the EAS alarm event. As such, personnel are not required to perform a manual comparison between a customer receipt and articles being removed. The portable RFID reader may also be equipped with an EAS device to deactivate an EAS tag that was inadvertently not deactivated at the POS station.

Figure 3:
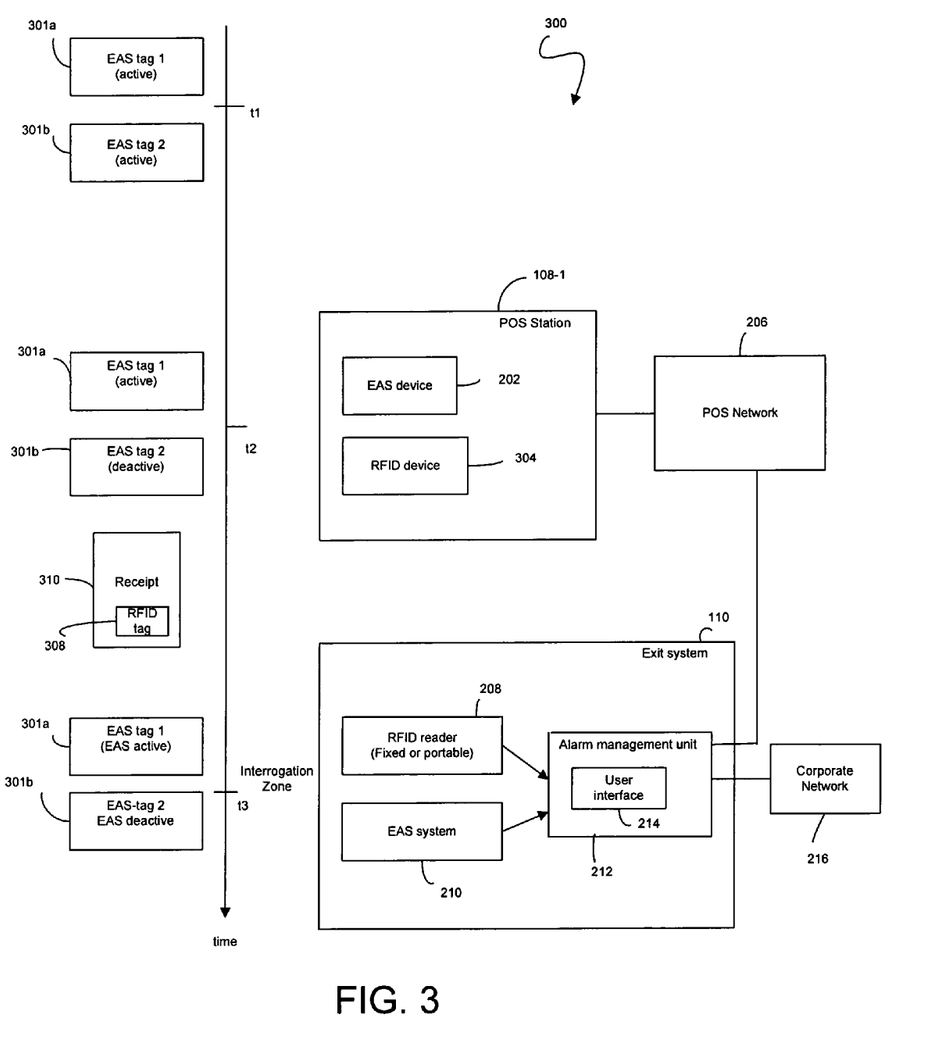
FIG. 3 is another more detailed block diagram of a point-of-sale station and exit system that may be utilized in the controlled area of FIG. 1 with an RFID tag affixed to a sales receipt.

FIG. 3 is a block diagram illustrating another embodiment 300 of a system consistent with the system of FIG. 1. The system 300 associates an RFID tag 308 with a customer sales receipt 310 associated with a POS transaction. The embodiment of FIG. 3 thus does not require an RFID tag associated with each article. The RFID tag 308 on the receipt 310 may store information related to the POS transaction. The RFID reader 208 of the exit system 110 may be utilized to read data regarding the POS transaction from the RFID tag 308, and provide the data to the alarm management unit which may be configured to identify, e.g. via a user interface 214, properly purchased articles. Those items being removed may be examined and compared against the list of properly purchased articles.

In operation, activated EAS tags 301a and 301b may be affixed to associated articles and remain activated on such articles at time t1. No RFID tags may be affixed or associated with such articles. At time t2, a customer may transport the articles and their associated EAS tags 301a, 301b to the POS station 108-1 for purchase. Upon completion of the POS transaction, the receipt 310 may be generated, and the RFID device 304 may be operated to record information related to the POS transaction in the RFID tag 308. The RFID tag 308 containing POS transaction information may be generated separately from the receipt, e.g. by the RFID device, and manually affixed to the receipt. Alternatively, the sales receipt may be generated with an embedded RFID tag 308 and the RFID device 304 may be configured to write POS transaction information to the tag 308, e.g. through wireless connection.

If the EAS tag 301a of a properly purchase article is inadvertently not deactivated, the EAS system 210 should detect this condition. The RFID portion 308 of the receipt 310 may then be read by the RFID reader 208 of the exit system 110 to quickly and efficiently recall POS transaction information that would reveal, in this particular example, the article associated with tag 301a was properly purchased.

Privacy

Privacy protection is concern associated with affixing RFID tags to articles in a retail environment. Some RFID tags may be long-range readable tags that are capable of being read by a RFID reader at long range without a customer's awareness or consent. For example, if a customer exited a retail store with an activated long-range RFID tag, an RFID reader may be operated to obtain information regarding the items in the customer's possession without the customer's awareness or consent. Any RFID tag should, therefore, be permanently disabled at the POS station.

However, if an activated RFID tag is inadvertently allowed to pass the POS station, an exit system consistent with an embodiment of the present invention may be adapted to detect the activated tag. Once an activated RFID tag is detected, corrective action may then be taken to prevent removal of the activated RFID tag from the controlled area. Corrective action may include removal of the RFID tag or deactivation/"killing" of the RFID tag.

Figure 4:
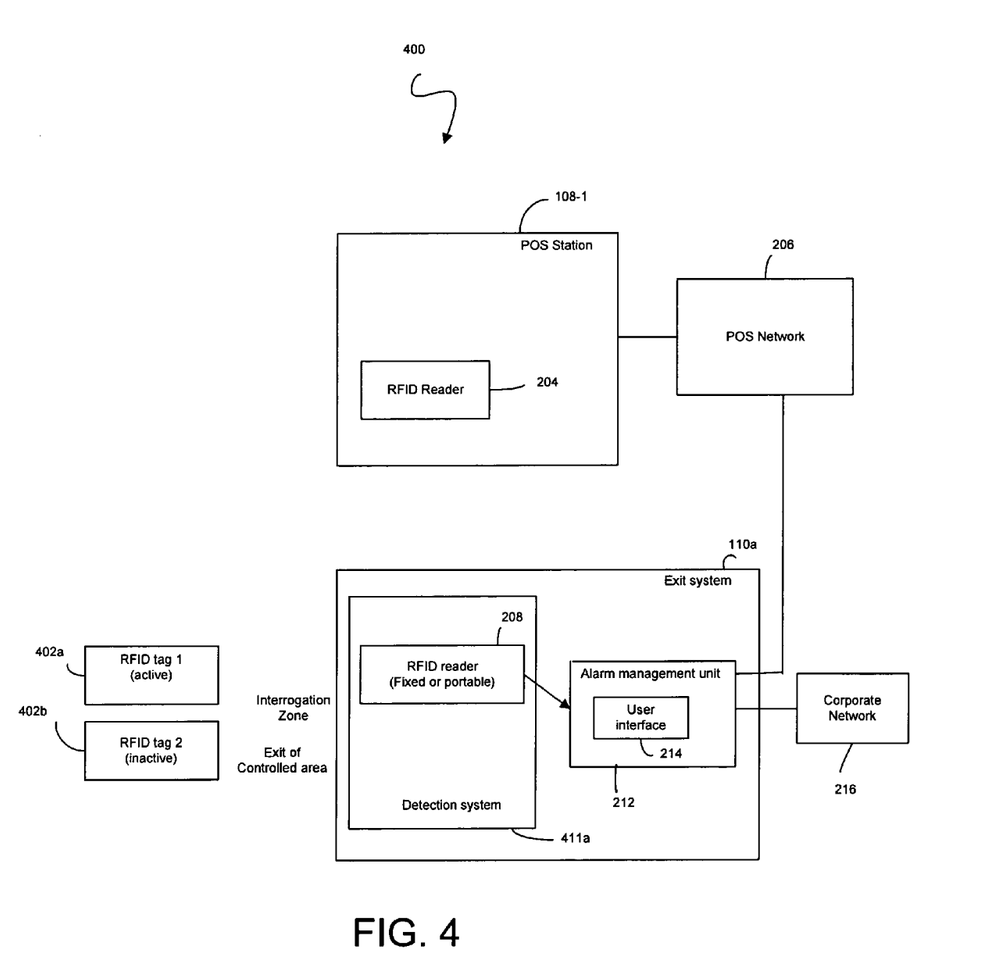
FIG. 4 is one system embodiment to detect a condition representative of an activated RFID tag at an exit of a controlled area.

FIG. 4 illustrates an exemplary system 400 including RFID tags 402a, 402b affixed to associated articles. The exit system 110a may include a detection system 411a to detect a condition representative of an activated RFID tag. The detection system 411a may include an RFID reader 208 adapted to detect any activated RFID tag, e.g., tag 402a, moved into the interrogation zone. Once an activated RFID tag is detected, corrective action may be initiated. Such corrective action may include sounding an alarm so that personnel may take appropriate action, e.g. to disable an activated RFID tag of a properly purchased item. The RFID reader 208 may also be adapted to automatically deactivate the activated RFID tag 402a. The exit system 110a may also be adapted to gather data associated with RFID alarm events triggered by activated RFID tags such that inadvertent causes of activated RFID tags can be identified and addressed. The data may include data identifying a particular cashier associated with repeated failures to deactivate RFID tags, data identifying potential sources of internal theft/collusion, and/or data indicating that particular RFID reader equipment may not be operating properly and hence may be in need of maintenance.

Figure 5:
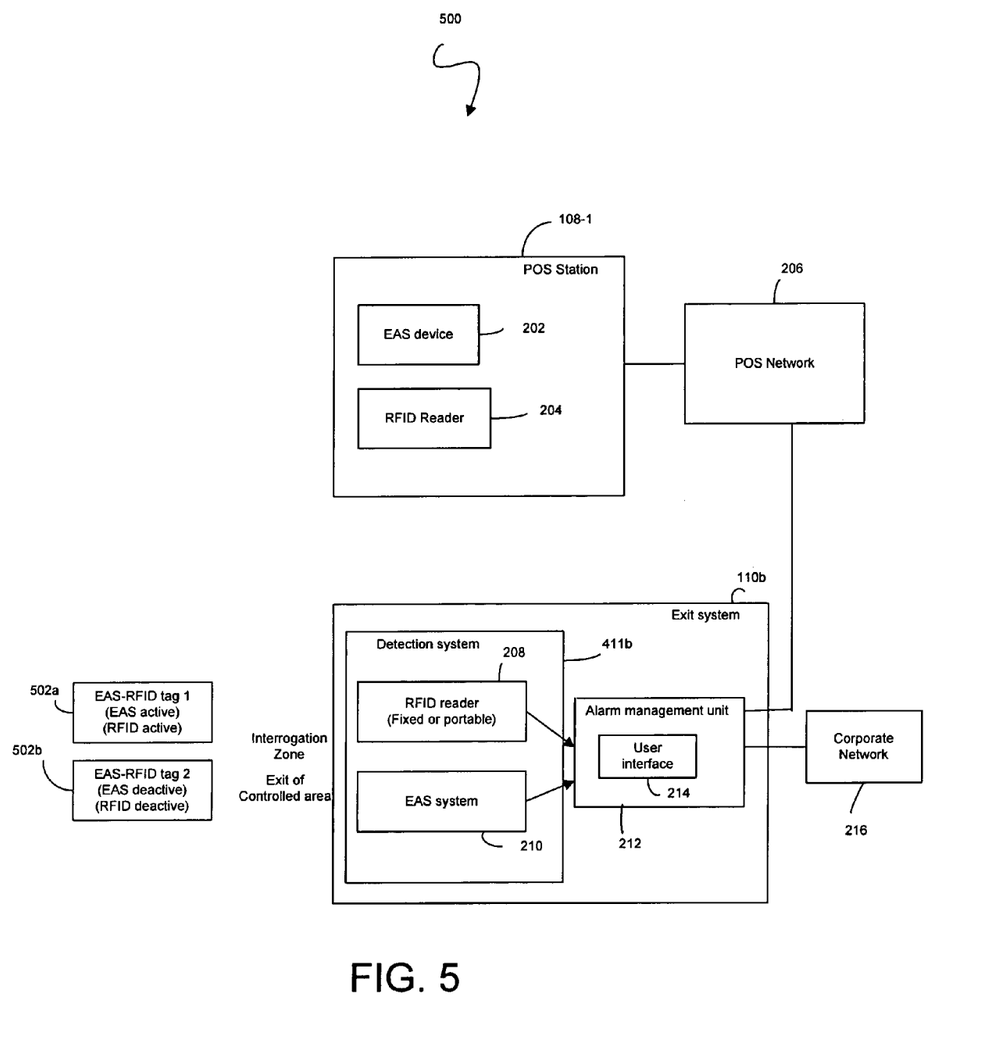
FIG. 5 is another system embodiment to detect a condition representative of an activated RFID tag at an exit of a controlled area.

FIG. 5 illustrates another exemplary system 500 consistent with the present invention, wherein combined EAS-RFID tags 502a, 502b are utilized with an exit system 110b having a detection system 411b capable of detecting a condition representative of an activated RFID tag. The detection system 411b includes an RFID reader 208 and an EAS system 210. The ability of the most reliable EAS system 210 to accurately detect EAS tags may be considerably better than the ability of the RFID reader 208 to accurately detect activated RFID tags. Advantageously, if the RFID reader 208 inadvertently does not detect an activated RFID tag, the EAS system 210 may detect an activated EAS tag, e.g., tag 502a. An activated EAS tag 502a may indicate that the RFID portion of the tag 502a may also be activated, and corrective action may be initiated. The EAS system 210 thus provides some redundancy to the RFID reader 208 in determining whether an activated long-range RFID tag is within the interrogation zone. The exit system 110b may be adapted to gather data associated with RFID alarm events triggered by activated RFID tags such that inadvertent occurrences of activated RFID tags within the interrogation zone can be identified and addressed.

Figure 6:
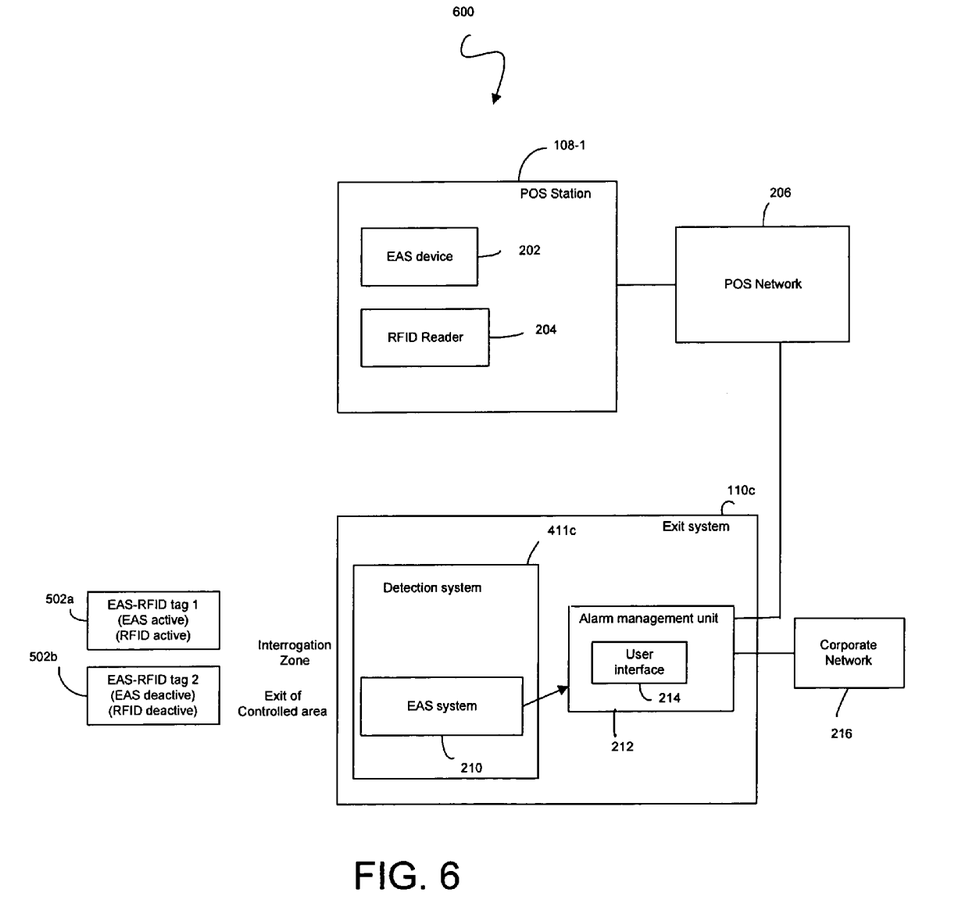
FIG. 6 is yet another system embodiment to detect a condition representative of an activated RFID tag at an exit of a controlled area.

FIG. 6 illustrates yet another system 600 utilizing combined EAS-RFID tags 502a, 502b and an exit system 110c having a detection system 411c capable of detecting a condition representative of an activated RFID tag. The detection system 411c may include only the EAS system 210 for detecting an activated EAS tag and assumes that an activated EAS tag in the interrogation zone indicates an activated RFID tag in the interrogation zone.

The exit system 110c enables use of existing EAS systems to detect a condition representative of an activated RFID tag. For a combined EAS-RFID tag, the exit system 110c may operate on the assumption that an activated EAS portion of the combined EAS-RFID tags, e.g., tag 502a, indicates that the RFID portion of that tag is also activated. This assumption may not prove accurate in all instances. However, the exit system 110c provides a low cost system for detecting a condition that may be representative of an activated RFID tag using existing EAS system resources.

Figure 7:
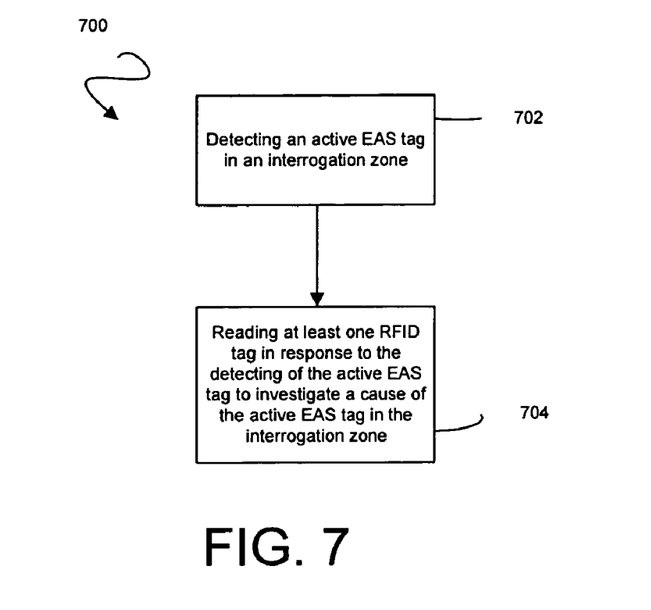
FIG. 7 is a flow chart illustrating operations according to an embodiment.

FIG. 7 is a flow chart of operations 700 consistent with an embodiment of the present invention. Operation 702 may include detecting an activated EAS tag in an interrogation zone. Operation 704 may include reading at least one RFID tag in response to the detecting of the activated EAS tag in the interrogation zone to investigate a cause of the activated EAS tag in the interrogation zone.

Figure 8:
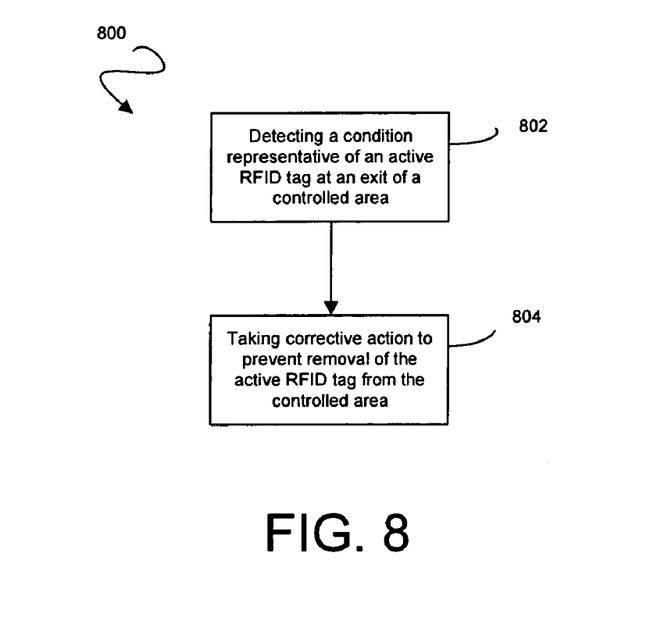
FIG. 8 is a flow chart illustrating operations according to another embodiment.

FIG. 8 is a flow chart of operations 800 consistent with another embodiment consistent with the present invention. Operation 802 may include detecting a condition representative of an activated RFID tag at an exit of a controlled area. Operation 804 may include taking corrective action to prevent removal of the activated RFID tag from the controlled area.

In summary, an exit system consistent with aspects of the present invention may include an EAS system and an RFID reader. The EAS system may be adapted to establish an interrogation zone at an exit of a controlled area and to detect if an activated EAS tag is in the interrogation zone. The RFID reader may be adapted to read at least one RFID tag in response to the EAS system detecting the activated EAS tag in the interrogation zone to facilitate investigation of a cause of the activated EAS tag in the interrogation zone. According to another aspect of the invention there is provided an exit system including a detection system adapted to detect a condition representative of an activated RFID tag at an exit of a controlled area.

Advantageously, investigation of the cause of EAS alarms may be streamlined by reading at least one RFID tag in response to detecting an activated EAS tag in an interrogation zone. When the RFID reader is fixed to a location and RFID tags are affixed to articles, the cause of the EAS alarms may investigated automatically without personnel intervention. The RFID reader may scan the articles being removed without requiring separate handling of each article. This enables efficient and accurate investigation of EAS alarm events, and ensures all EAS alarm events are investigated. The system may also be utilized to ensure efficient reporting and analysis of EAS alarm events Personnel intervention may be allowed if a portable RFID reader is utilized. However, the portable reader may perform a similar function as the fixed RFID reader enabling accurate and efficient reconciliation of those articles being removed with those articles authorized for removal without requiring the personnel to perform a manual comparison between the receipt and articles being removed. Security may be provided to address privacy concerns by detecting a condition representative of an activated RFID tag at an exit of a controlled area, and then taking corrective action to prevent removal of the activated RFID tag from the controlled area.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   storing point-of-sale information in an RFID tag;
   detecting an activated EAS tag in an interrogation zone; and
   automatically reading said stored point-of-sale information from said RFID tag in response to said detecting of said activated EAS tag in said interrogation zone and determining a cause of said activated EAS tag in said interrogation zone.

2. The method of claim 1, wherein said at least one RFID tag is affixed to an article, and said reading operation comprises reading sales transaction information indicating whether said article has been properly purchased.

3. The method of claim 2, wherein said reading operation is conducted by an RFID reader configured to automatically read said at least one RFID tag affixed to said article in response to said detecting of said activated EAS tag in said interrogation zone.

4. The method of claim 1, wherein said at least one RFID tag is affixed to a sales receipt associated with a point-of-sale transaction for at least one article, and said reading operation comprises reading sales transaction information associated with said point-of sale transaction.

5. The method of claim 4, wherein said sales transaction information indicates whether said at least one article was properly purchased, and wherein said method further comprises comparing said sales transaction information with an article being physically removed from a controlled area to determine if said article has been properly purchased.

6. A system comprising:
   an RFID tag storing point-of-sale information;
   an EAS system adapted to establish an interrogation zone and to detect an activated EAS tag in said interrogation zone; and
   an RFID reader adapted to automatically read said stored point-of-sale information from said RFID tag in response to said EAS system detecting said activated EAS tag in said interrogation zone and determining a cause of said activated EAS tag in said interrogation zone using said read point-of-sale information.

7. The system of claim 6, wherein said at least one RFID tag is affixed to an article, and wherein said RFID reader is adapted to read sales transaction information from said at least one RFID tag indicating whether said article has been properly purchased.

8. The system of claim 7, wherein said RFID reader is adapted to automatically read said at least one RFID tag affixed to said article in response to said EAS system detecting said activated EAS tag in said interrogation zone.

9. The system of claim 6, wherein said at least one RFID tag is affixed to a sales receipt associated with a point-of-sale transaction for at least one article, and said RFID reader is adapted to read sales transaction information from said at least on RFID tag associated with said point-of sale transaction.

10. The system of claim 6, further comprising an alarm management unit in communication with one or more of the EAS system and the RFID reader.

11. The system of claim 10, wherein the alarm management unit is in bidirectional communication with both the EAS system and the RFID reader.

12. A method for detecting an EAS alarm event comprising:
  storing point-of-sale information in an RFID tag;
  detecting a state of an EAS tag on an article being removed from a POS transaction location, the article containing said RFID tag;
  automatically interrogating the RFID tag to read said point-of-sale information in response to a detected state of said EAS tag; and
  determining if the article is the subject of a theft based on said read stored point-of-sale information.

13. The method of claim 12, wherein determining if the article is the subject of a theft includes comparing the identity of the article with the POS transaction data.

14. The method of claim 12, wherein detecting the state of the EAS tag determines the state of the RFID tag.

15. The method of claim 12, wherein the EAS tag and the RFID tag are provided in a combined EAS-RFID tag.

16. The method of claim 12, wherein the RFID tag is interrogated by an RFID reader.

17. The method of claim 16, wherein the RFID reader is portable.

18. The method of claim 16, wherein if the state of the EAS tag is active, the RFID reader further comprises an EAS device to deactivate the EAS tag.

* * * * *